United States Patent [19]
Randall

[11] 3,722,522
[45] Mar. 27, 1973

[54] VORTEX FLUID AMPLIFIER WITH NOISE SUPPRESSER

[75] Inventor: James E. Randall, Worthington, Ohio

[73] Assignee: Ranco Incorporated, Columbus, Ohio

[22] Filed: June 10, 1971

[21] Appl. No.: 151,698

[52] U.S. Cl. ................................................. 137/81.5
[51] Int. Cl. ................................................. F15c 1/16
[58] Field of Search ............... 137/81.5; 73/515, 194

[56] References Cited

UNITED STATES PATENTS

| | | | |
|---|---|---|---|
| 3,343,790 | 9/1967 | Bowles | 137/81.5 X |
| 3,424,182 | 1/1969 | Mayer | 137/81.5 |
| 3,537,466 | 11/1970 | Chapin | 137/81.5 |

Primary Examiner—William R. Cline
Attorney—Watts, Hoffmann, Fisher & Heinke

[57] ABSTRACT

A fluid vortex amplifier has a pin disposed in the position of the eye of a fluid vortex at the oulet of the vortex chamber so that the pin stabilizes the eye of the vortex and reduces the noise otherwise generated.

6 Claims, 7 Drawing Figures

PATENTED MAR 27 1973 3,722,522

INVENTOR.
JAMES E. RANDALL
BY
Watts, Hoffmann, Fisher & Heinke
ATTORNEYS

VORTEX FLUID AMPLIFIER WITH NOISE SUPPRESSER

BACKGROUND OF THE INVENTION

It has been known to control the rate of flow of fluids through a conduit or flow system by creating a vortex in the flowing fluid. This may be achieved by directing a main flow of the fluid radially in a cylindrical chamber and exiting the fluid through an outlet opening in an end wall of the chamber and coaxial with the chamber. The flow of fluid through the chamber may be more or less impeded or restricted by directing one or more relatively small jets of control fluid into the main stream of fluid in the chamber so as to impart a rotating or vortical movement to the fluid at the outlet of the chamber. This creates a fluid vortex in the chamber with the eye or center thereof generally more or less centrally of the chamber depending upon the velocity of the fluid. As the velocity of the vortex increases, the flow of fluid from the chamber is increasingly restricted. One disadvantage of fluid amplifiers of the vortex type is that under certain flow restricting conditions the vortex becomes unstable and produces an objectionable whistling noise.

THE PRESENT INVENTION

An object of the present invention is the provision of a vortex fluid amplifier of the type mentioned in which means are provided to substantially stabilize the fluid vortex and thereby reduce or minimize the noise produced in the vortex amplifier.

More specifically, the invention comprises providing a fluid vortex amplifier having a cylindrical chamber with a fluid inlet means for directing the main fluid flow in a radial direction relative to the cylindrical side walls of the chamber, a fluid outlet in an end wall of the chamber substantially coinciding with the axis of the chamber, control fluid jet nozzle means adapted to direct a fluid stream tangentially into the chamber for imparting a vortical movement to the fluid in the chamber, and a pin-like member in the chamber extending parallel to the axis of the chamber and adjacent the outlet whereby the pin-like member is disposed generally at the eye of the vortex in the chamber, thus stabilizing the vortex.

In other forms of the invention the eye of the vortex formed by the control fluid jet tends to travel along a line radially of the axis of the chamber, in which case the axis of the pin-like member is offset from the axis of the chamber midway between the axis of the chamber and the limit of the normal excursion of the eye of the vortex.

Other objects and advantages of the invention will be apparent from the following description of preferred forms of the invention, reference being made to the accompanying drawings wherein.

Figure 1:
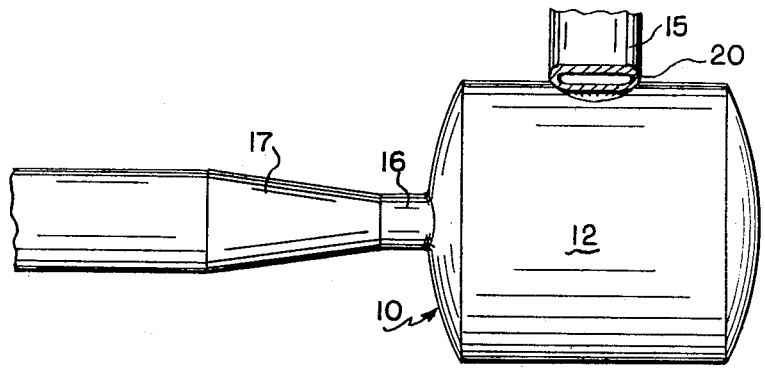
FIG. 1 is a side elevational view of a fluid vortex amplifier embodying the invention.

Referring to the drawings a pure fluid vortex amplifier 10 is shown which, by way of example, may be utilized to modulate the flow of refrigerant from the evaporator to the compressor in a refrigeration system. The amplifier comprises a chamber 11 having cylindrical side walls 12 and is closed by end walls 13, 14. The fluid to be controlled enters the chamber 11 through an inlet tube 15. The axis of the tube 15 is substantially normal to the axis of the chamber 11. A fluid outlet 16 is formed in the end wall 14 and comprises a tubular diffuser member 17 which provides a flare or expansion of the fluid passage as the fluid moves from the chamber 11. The axis of the opening 16 is coincident with that of the chamber 11.

Figure 4:
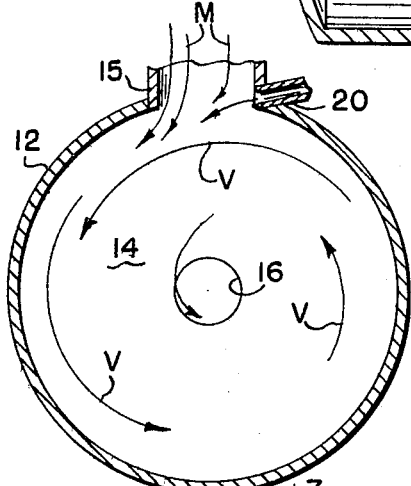
FIGS. 4 and 5 are schematic views of the amplifier illustrating the manner in which the center of the fluid vortexes shift.

A fluid control nozzle 20 is formed in one side of the tubular inlet 15 and at the juncture of the tube with the sides 12 of the chamber 11. The nozzle 20 is adapted to direct a stream of control fluid into the main stream of fluid entering the chamber through the inlet 15, and the control fluid stream is directed tangentially of the inside of the chamber. The nozzle 20 is connected with a source of fluid, not shown, the flow and pressure of which can be regulated in a convenient manner according to the restriction desired to be placed on the flow of the fluid. When fluid is flowing through the chamber 11 while the control fluid is shut off, the main flow of fluid will pass through the chamber with relatively little restriction. When control fluid is discharged from the nozzle 20, the main stream of fluid entering the chamber 11 through inlet 15 is deflected, and striking the cylindrical walls 12, the fluid is directed into a circular movement which creates a vortex. This action is illustrated in FIG. 4 wherein the arrow M indicates the main fluid stream and the arrow C indicates the control fluid stream. The resulting vortex is indicated by the arrow V. As is well known, the pressure at the center of the vortex is relatively low. Because the outlet 16 is approximately coaxial with the axis of the vortex, consequently flow from the chamber 11 through the outlet is restricted by the low pressure area at the outlet. As the force of the control fluid issuing from nozzle 20 increases the velocity of the fluid moving in the vortex increases.

Figure 5:
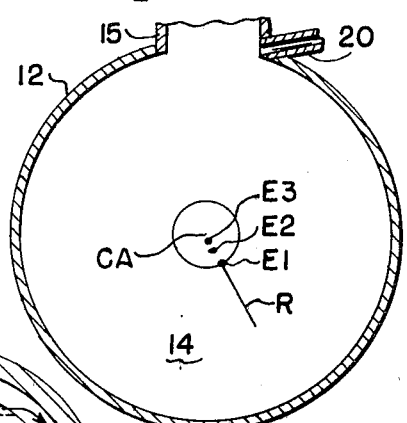

It has been discovered that the axis of the fluid vortex tends to shift radially with respect to the axis of the chamber 11 as the pressure of the control fluid varies. When the control fluid pressure is relatively low, and a "weak" vortex results, the center or "eye" of the vortex tends to be relatively substantially offset from the axis of the chamber. As the pressure of the control fluid increases and the velocity of the fluid in the vortex increases, a "strong" vortex results and its "eye" moves more into coincidence with the axis of the chamber 11. This condition is illustrated in FIG. 5 wherein point E1 shows the eye of the vortex relative to the axis CA of the chamber 11 when the pressure of the control fluid is relatively low and the vortex is weak. E2 shows the vortex eye position when the pressure of the control fluid is at a second, higher pressure. E3 likewise shows the position of the vortex eye when the control fluid pressure is still higher than that for E2. The eyes E1, E2, E3 of the vortex will generally shift along a line R which extends generally radially of the axis of the chamber. In one form of the invention the angle of line R relative to the angle of the inlet fluid jet stream was about 139°. This angle might vary according to variation in the angle of the fluid inlet discharge or the angle of the control jet discharge.

Figure 2:
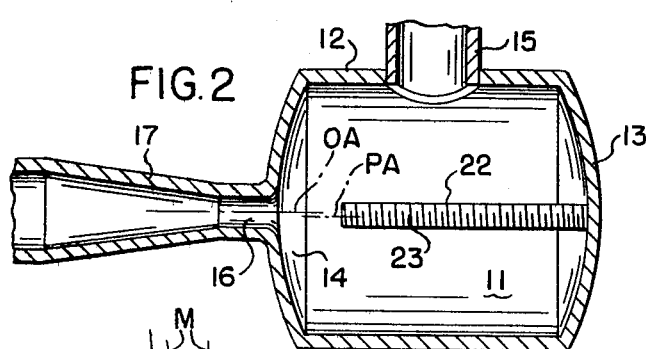
FIG. 2 is a sectional view taken substantially along line 2—2 of FIG. 3.
Figure 3:
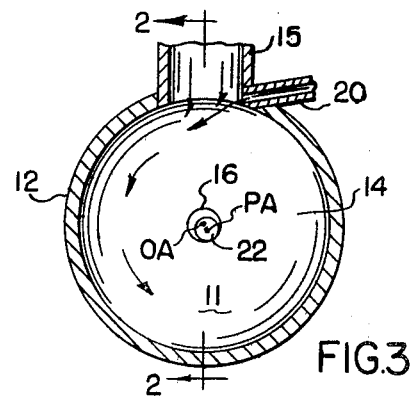
FIG. 3 is a sectional view taken substantially along line 3—3 of FIG. 1.

It has been observed that under certain conditions, particularly when the velocity of the fluid passing through the amplifier is relatively high, the eye of the vortex oscillates along the line R and relative to the axis of the outlet port which oscillations produce an objectionable whistling noise. It has been discovered that by installing a post or pin 22 in the chamber 11 and positioned so that its axis is coincident with the average or mean position of the centers or eyes of the vortexes produced in the chamber, the vortex positions will be stabilized and the noise is substantially reduced or eliminated. The pin 22 is suitably secured at one end to the wall 13 and extends towards the outlet 16, terminating somewhat short thereof. Preferably, the pin 22 has rough surfaces and in the form shown, the rough surface comprises threads 23 formed on the pin. The axis PA of the pin is offset from the axis OA of the chamber 11, as seen in FIGS. 2 and 3. The pin 22 is also positioned so that its axis is substantially on the line R which corresponds to the path along which the vortexes travel in response to different pressures of the control fluid and the main fluid stream. The distance of the axis of the pin from the axis of the chamber along the line R may be determined so as to be approximately the mean position of the range of excursions of the eyes of the vortexes of minimum to maximum velocities to be encountered.

In operation, the fluid vortexes formed in the chamber 11 tend to form with the pin 22 at the vortex or eye thereof and to remain relatively fixed. This eliminates the usual oscillation and the accompanying whistle.

Figure 6:
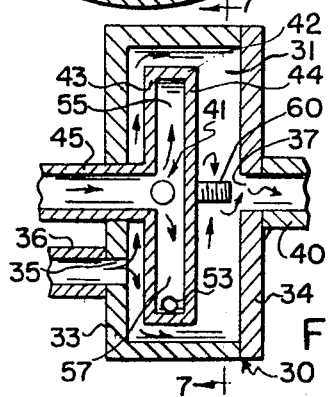
FIG. 6 is a sectional view of another form of fluid amplifier, the section being taken substantially along line 6-6 of FIG. 6.
Figure 7:
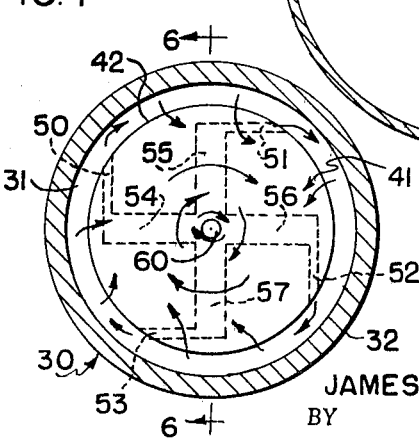
FIG. 7 is a sectional view taken substantially along line 7—7 of FIG. 6.

A second form of fluid vortex amplifier 30 embodying the invention is shown in FIGS. 6 and 7. The amplifier 30 comprises a chamber 31 formed by cylindrical side walls 32 and circular, flat end walls 33, 34. An inlet 35 is formed in the end wall 33 eccentric relative to the axis of the chamber 31. The main flow of fluid is directed into the chamber 31 through a suitable conduit 36 secured in the inlet. A fluid outlet 37 is formed in the wall 34 of the chamber coaxial with the axis of the chamber. A suitable conduit 40 is secured in the outlet and receives the fluid discharged from the chamber 31.

A relatively flat circular fluid diverting and control unit 41 is disposed in the chamber 31. The unit 41 has cylindrical side walls 42 and flat ends 43,44. A hollow stem 45 projects from the end 43 of the unit 41 and is secured in an opening through the end wall 33 of the chamber 31. The stem 45 supports the unit 41 concentric with the chamber 31. Fluid entering the inlet 35 strikes the end 43 of the unit 41 and is directed radially of the chamber 31, along the inside of walls 32, and then exits the outlet 37. The main stream of fluid passing through the chamber 31 is adapted to assume the form of a vortex by control fluid injected generally tangentially of the chamber 31 into the chamber through four jet nozzles 50, 51,52,53 in the side walls 42 of the unit 41. Control fluid is fed to the nozzles 50-53 through bores 54,55,56,57, respectively, the inner ends of which bores are open to the interior of the stem 45. The control fluid is fed to the stem 45 by any convenient means, not shown, and the higher the pressure of the control fluid, the greater is the velocity of the vortex formed in the chamber 31 by the main stream of fluid. Accordingly, restriction to the flow of fluid through the outlet is correspondingly greater.

To maintain stability of position of the fluid vortex, a pin-like member 60 is attached to the end 44 of the unit 41. The pin-like member is coaxial with the axis of the chamber 31 and the outlet 37 and terminates somewhat short of the entrance to the outlet. The member 60 materially reduces the noise otherwise generated by the vortex under usual conditions. Preferably, the member 60 is threaded which presents a rough surface to the fluid passing through the chamber and appears to improve the effectiveness of the member in reducing noise.

I claim:

1. A fluid vortex amplifier comprised of a cylindrical chamber having an outlet port at one end and substantially coincident with the axis of said chamber, a fluid inlet port in a wall of said chamber, means to direct a main stream of fluid radially in said chamber relative to the axis of said chamber, and a nozzle structure adapted to direct a control fluid flow generally tangentially in said chamber for imparting a vortex to said main stream of fluid, characterized by a fixed pin-like member disposed in said chamber having its axis substantially parallel to the axis of said chamber and forming a pivot about which said vortex rotates, said pin-like member having an irregular surface.

2. A fluid amplifier as defined in claim 1 further characterized by said pin-like member having a threaded surface.

3. A fluid amplifier as defined in claim 1 further characterized by said fluid inlet port located in a side wall of said chamber and adapted to direct a main stream of fluid radially into said chamber, and said nozzle structure adapted to direct a control stream of fluid into said main stream entering said inlet and generally tangential of said chamber.

4. A fluid amplifier as defined in claim 1 further characterized by said pin-like member being concentric with said outlet port.

5. A fluid amplifier as defined in claim 1 further characterized by said pin-like member being eccentric to said outlet port.

6. A fluid vortex amplifier as defined in claim 1 further characterized by said inlet port being located in the end wall of said chamber opposite the end having said outlet port, circular wall means in said chamber arranged to deflect fluid entering said chamber through said inlet radially of said chamber and said fixed pin-like member having an irregular surface located on said wall means and extending coaxially with an outlet port.

* * * * *